No. 755,164. PATENTED MAR. 22, 1904.
H. PEASE.
PITMAN CONNECTION.
APPLICATION FILED OCT. 29, 1903.
NO MODEL.
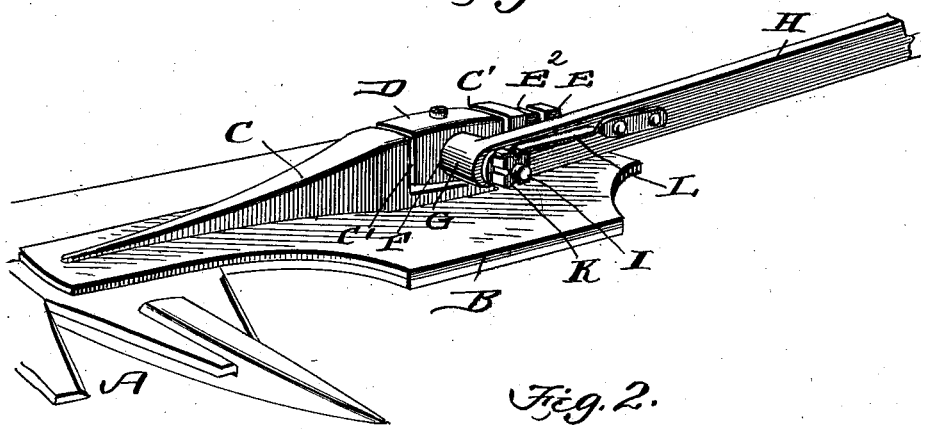
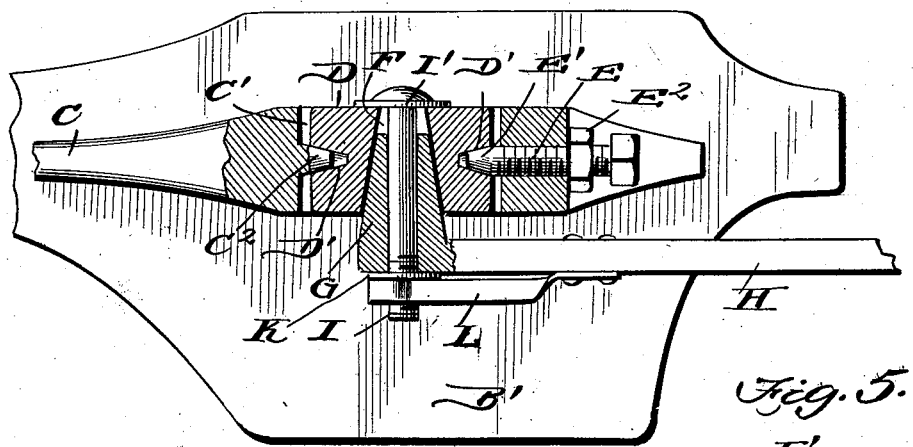
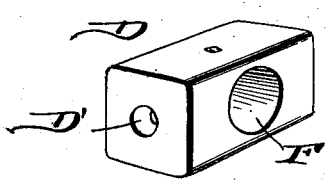
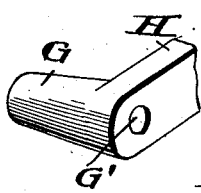
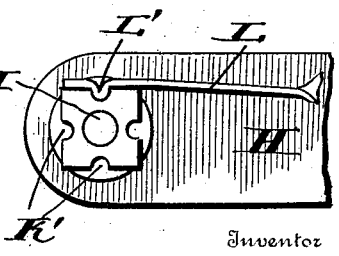
Witnesses
Inventor
Harrison Pease.
By
Attorney No. 755,164. Patented March 22, 1904.

UNITED STATES PATENT OFFICE.

HARRISON PEASE, OF GILES, NEBRASKA.

PITMAN CONNECTION.

SPECIFICATION forming part of Letters Patent No. 755,164, dated March 22, 1904.

Application filed October 29, 1903. Serial No. 179,056. (No model.)

*To all whom it may concern:*

Be it known that I, HARRISON PEASE, a citizen of the United States, residing at Giles, in the county of Brown and State of Nebraska, have invented a new and useful Pitman Connection, of which the following is a specification.

This invention is an improved construction of pitman connection for knife-heads, the object of the invention being to provide a connection which will have free movement in both directions and one in which the wear of the parts incidental to the operation of the device can be quickly and easily taken up; and with these objects in view the invention consists in the novel features of construction and combination, all of which will be fully described hereinafter and pointed out in the claims.

In the accompanying drawings, Figure 1 is a perspective view illustrating a pitman connection constructed in accordance with my invention. Fig. 2 is a horizontal sectional view of the connection. Fig. 3 is a detail perspective view of a rocking block. Fig. 4 is a detail perspective view of the end of the pitman; and Fig. 5 is a detail view showing the manner of locking the nut upon the bolt, securing the pitman.

Referring to the drawings, A indicates the cutter-bar, having a head B connected thereto, said head having a rib or an enlargement C formed thereon, which rib or enlargement has a recess or socket C', in which rocks the block D, each end of the block having a tapering recess D', and fitting in one of the recesses is the cone-shaped projection C², integral with the rib or enlargement C and projecting horizontally into the socket or recess C'. The tapered end E' of a screw E fits into the tapered recess D' at the opposite end of the block, said screw passing through the end of the rib or projection C, as most clearly shown in Fig. 2, and is made fast by means of the jam-nut E².

The block D has a transverse bore F, which is made tapering, as shown, said bore being intended to receive the correspondingly-tapering finger G, formed integral with the end of the pitman H, and this finger G is made with a longitudinal bore G', through which passes a bolt I, said bolt being inserted through the opposite end of the bore F, and a washer I' is interposed between the head of this bolt and the side of the block B. A nut K is screwed upon the threaded end of the bolt, said nut being preferably provided with grooves or notches K' in the side faces thereof for the engagement of a locking-spring L, attached to the pitman H, said spring being upset, as shown at L', for the purpose of engaging the notch K' in the side of the nut, thereby holding the nut against rotation.

By means of the construction herein shown and described a universal joint is arranged between the pitman and sickle-head, and wear upon the parts can be taken up by adjusting the screw E and nut K, and by having the said screw and nut securely locked it is obvious that the parts can be adjusted so as to give free movement in both directions without endangering the security of the connection.

Having thus fully described my invention, what I claim as new, and desire to secure by Letters Patent, is—

1. A pitman connection comprising a head having a rib, the said rib having a recess, a block journaled in the recess, said block having a transverse tapering bore, a pitman having a laterally-projecting tapered finger, said finger having a longitudinal bore, and a bolt passing through the block and the tapered finger, and a nut secured upon the threaded end of the bolt, as set forth.

2. A pitman connection comprising in combination a head having a rib, said rib being formed with a recess, a block journaled in said recess, one of the journals being adjustable, said block having a transverse tapering bore, a pitman having a laterally-projecting tapered finger, adapted to fit into the tapered bore of the block, said finger having a longitudinal bore, a bolt passing through the block and the finger arranged therein, a nut secured upon the threaded end of the bolt, the side faces of said nut being notched, and a spring secured to the sides of the pitman and adapted to engage the nut and hold it against rotation, substantially as described.

HARRISON PEASE.

Witnesses:
  A. G. HOFFMAN,
  F. W. TUBBS.